A. LONGORIA.
WATER HEATER.
APPLICATION FILED JULY 15, 1915.
1,217,967.
Patented Mar. 6, 1917.
2 SHEETS—SHEET 1.
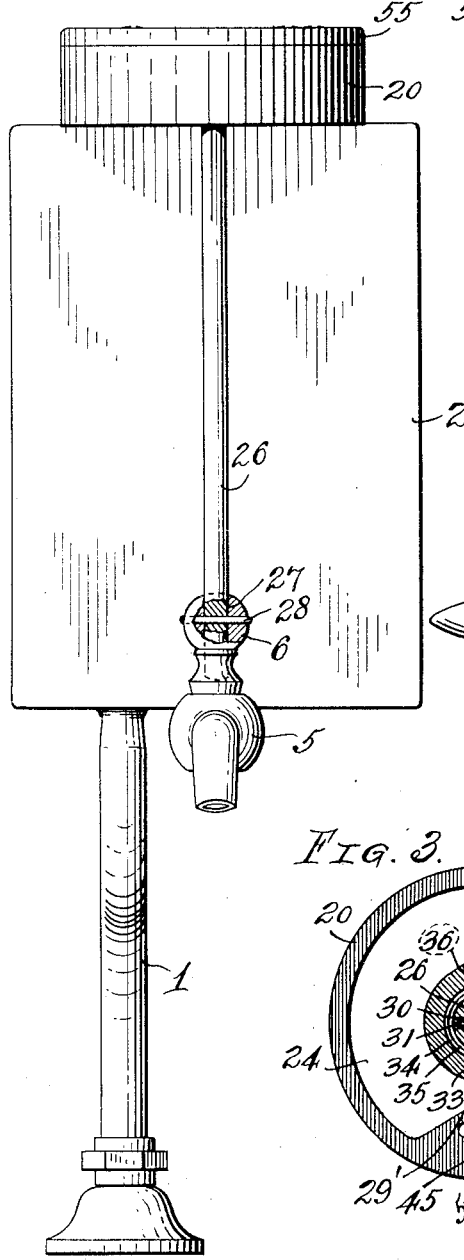
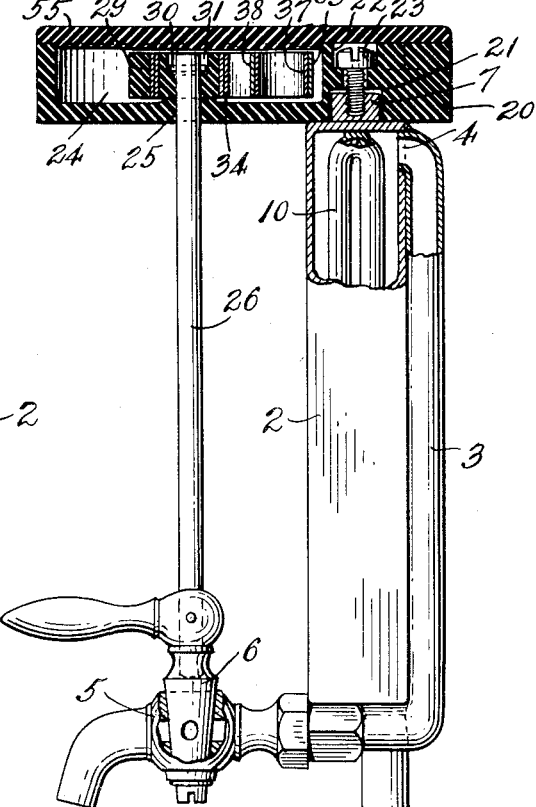
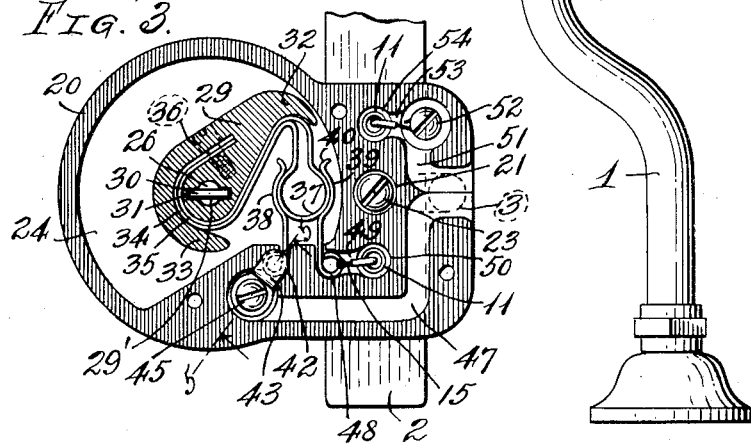
Witnesses:
A. L. Lord
D. Tozer
Inventor.
Antonio Longoria
by B. W. Brockett
Att'y.

A. LONGORIA.
WATER HEATER.
APPLICATION FILED JULY 15, 1915.
1,217,967.
Patented Mar. 6, 1917.
2 SHEETS—SHEET 2.
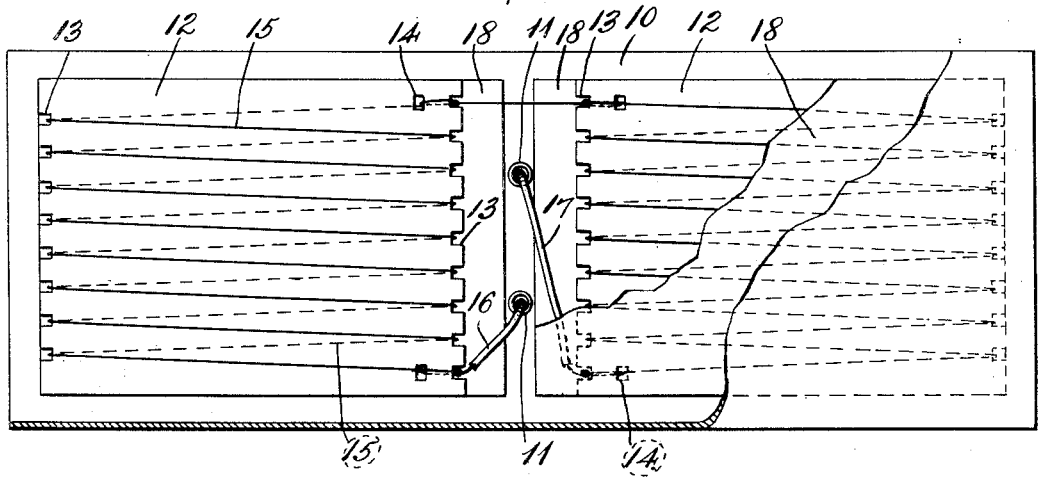
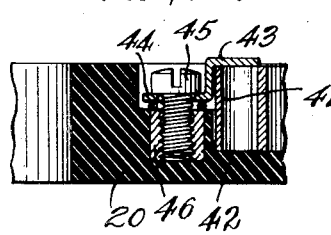
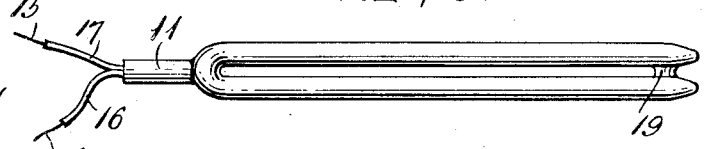
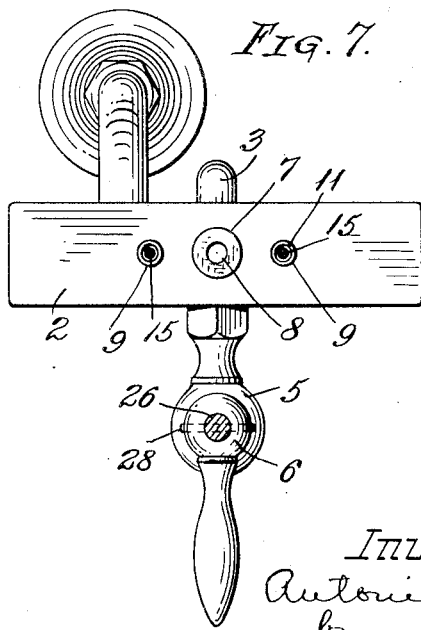
Witnesses:
A. L. Lord
D. Tozer
Inventor.
Antonio Longoria
by J. W. Frost
Atty.

UNITED STATES PATENT OFFICE.

ANTONIO LONGORIA, OF CLEVELAND, OHIO, ASSIGNOR TO THE STERLING CORPORATION, OF CLEVELAND, OHIO, A CORPORATION OF OHIO.

WATER-HEATER.

1,217,967. Specification of Letters Patent. Patented Mar. 6, 1917.

Application filed July 15, 1915. Serial No. 39,994.

*To all whom it may concern:*

Be it known that I, ANTONIO LONGORIA, a subject of the King of Spain, residing at Cleveland, in the county of Cuyahoga and State of Ohio, have invented certain new and useful Improvements in Water-Heaters, of which the following is a specification.

This invention relates to water heating apparatus and particularly to a self-contained unit to be connected to the water supply and to any source of current supply, and to furnish a constant stream of heated water.

More specifically the invention relates to a self-contained water heater comprising a casing having a heating chamber therein connected at a low point with the water supply and at an upper point with a water discharge and having within the same an electrical heating unit in turn connected to suitable switch mechanism adapted to be actuated by the spigot or other valve in the discharge.

The invention may be further briefly summarized as consisting in the construction and combination of parts hereinafter set forth in the following description, drawings and claims.

Referring to the drawings, Figure 1 is a front elevation of the device; Fig. 2 is a side elevation with portions broken away and in section; Fig. 3 is a top plan view of a part of the device with the cover removed from the switch mechanism; Fig. 4 is a view partly in plan and section showing the heating element spread out; Fig. 5 is a detail sectional view of the parts on the line 5—5 of Fig. 3; Fig. 6 is an end elevation of the heating element when folded; and Fig. 7 is a top plan view of the device with the switch removed.

In the embodiment of the invention set forth in the drawings, 1 represents a suitable water supply pipe adapted to be connected to any source of water supply. This pipe is secured to the bottom of a heater casing 2 and is in communication with the heating chamber therein. Secured to the back of the heating chamber is a discharge pipe 3 leading to a point near the top where it communicates by a suitable opening 4 with the interior of the heater casing. This pipe extends forward under the bottom of the heater casing and is provided with a suitable spigot or valve 5 for controlling the discharge from the device. This valve has a suitable plug 6 adapted to close the discharge when the handle is outward and to open the discharge when the handle is moved to either side. The heater casing 2 is provided at its upper end with a centrally disposed upwardly extending boss 7 having a threaded opening 8 therein, for a purpose to be described. On each side of this boss is a suitable opening 9 for a purpose to be described.

Within the heater casing 2 a heating element is arranged and this element is preferably formed by employing an outer element casing 10, preferably of copper, of the proper size so that when it is folded once upon itself it will present a folded piece which is a little less in width than the width of the heater casing 2 and is substantially twice the length. This casing is then folded transversely at the center upon itself so that it will be of the proper dimension to fit within the casing. The sheet of metal when first folded upon itself with the element therein, is soldered around the edges so that it is water-tight, and provided with a pair of tubes 11, as shown in Figs. 4 and 6, these tubes being arranged at the transverse center of the casing when it is first folded upon itself, as shown in Fig. 4. These tubes are for the leads of the heating unit.

The heating element comprises two portions, one arranged in each of the legs of the element casing when folded as shown in Fig. 6, and each of these element portions comprises an inner sheet of insulation 12 having in the ends thereof notches 13 which receive the resistance wire. The inner insulation sheet 12 is provided near each of the end notches toward the center of the element casing, as shown in Fig. 4, with suitable openings 14. The resistance wire 15 is led through one of these openings 14, thence along the side of the inner insulation sheet 12 to the adjacent notch 13 from whence it passes to the notch at the opposed edge of the insulation sheet 12 and so on in a substantially spiral arrangement to the last notch, from whence it passes through the other opening 14 adjacent to the last notch.

In the embodiment shown the two elements are connected in series with two terminal leads 16 and 17 which are suitably insulated and pass out through the tubes 11. On either side of the inner insulation sheet 12 are suitable side insulation sheets 18 which insulate the resistance wire from the element casing 10. After these elements are completed, the element casing is soldered about the edges as before stated, or otherwise made water-proof, and the element is bent upon itself to form a U-shape, as shown in Fig. 6, the free ends of the legs being held in the proper relationship by means of a spot of solder 19. The tubes 11 project through the openings 9 and are soldered or otherwise secured therein. The arrangement of the heating element when completed is such that there is a space for water between the legs of the U and a space between the outside thereof and the heater casing for the passage of water in a thin stream so that it will be readily acted on by the heating element.

Arranged upon the top of the heater casing is suitable switch mechanism, and it comprises a lower switch housing 20 of any suitable insulating material. This housing is provided with an opening 21 for receiving the boss 7 and an opening 22 in alinement therewith for receiving a screw 23 passing through an opening in the housing and into the threaded opening 8 for holding the housing in place. The housing is further provided, preferably toward the front, with a switch chamber 24 communicating with an opening 25 extending through the bottom of the housing in alinement with the axis of the valve plug 6. This opening 25 receives a switch-actuating stem 26 extending down into an opening 27 in the valve plug 6 and secured therein by means of a pin 28 extending through the plug so that when the plug is moved the stem 26 is moved also. The upper end of the stem 26 enters a suitable opening in a switch member 29 and is provided with a slot 29' receiving a pin 30 which engages in suitable diametrically opposed recesses 31 extending from the opening through which the stem 26 passes in the switch member. By this arrangement it will be seen that when the stem is actuated, the switch member will be actuated also.

The switch member is provided with a spring supporting hook 32 at its outer end and an integral tripping hook portion 33 spaced from the main body of the switch member, extending for a distance concentric with the stem 26 and finally projecting outward at a tangent. Arranged within the slot formed by this tripping hook portion is a switch spring made up of a strip and having two portions 34 and 35, following the configuration of the switch member and entering the slot between the tripping hook portion and the main body portion and secured therein by means of a screw 36, shown in dotted lines in Fig. 3. These portions 34 and 35 of the switch spring are then curved upward within the supporting hook 32 and unite and terminate in a ring 37. This ring is adapted to engage between contacts 38 and 39 having outwardly bent end portions 40 to facilitate the entry of this ring. The contact 38 is provided with a circular portion 41 arranged in a pocket 42 in the housing and it is engaged at its upper end by a flat contact clip 43 having a binding portion 44 arranged beneath the head of a binding screw 45 threaded into a brass bushing 46 secured in the housing. This binding screw receives one of the line wires which passes through a suitable channel 47 arranged in the housing and extending to the rear thereof, as shown in Fig. 3. The other contact spring is provided with a circular portion 48 soldered or otherwise secured to one of the leads 16 and 17 and extending through a suitable channel 49 communicating with an opening 50 arranged in the housing and receiving the end of one of the tubes 11. The other incoming wire is led through a suitable channel 51 to a binding screw 52 secured in the housing and connected to the other one of the leads 16 and 17, which passes through a channel 53 to an opening 54 receiving one of the tubes 11 and thence down through this tube to the element, etc. A suitable cover 55 of insulation is provided for the housing 20 and it engages the contact clip 43 and serves to hold the same in place.

Assuming that the spigot is in the position shown, which is closed position, and further assuming that the switch member 29 is in a position at 90° to the left of that in which it is shown in Fig. 3 and that the heater casing is filled with water, and further that the operator shifts the valve plug handle to the left, this operation causes the ring 37 to enter between the contacts 38 and 39, with the result that the line circuit is connected to the heating element, and the water is heated as it passes out. As soon as the spigot is moved back to closed position, or to the opposite side, the switch member is shifted out of closed position, and the water will either be cut off or cold water will pass through the device.

Having described my invention, I claim:—

1. A self-contained water heater comprising a water supply pipe, a heater casing in communication therewith, a discharge pipe, valve mechanism in the discharge and having two positions of discharge, an electrical heating element within the heater casing having connections leading to the outside, switch mechanism connected to the heating element, and connections between the switch mechanism and the spigot, said switch mechanism in said connections being arranged so that when the spigot is in one discharge position, the circuit will be closed and when in the other, the circuit will be open.

2. A self-contained water heater comprising a supply pipe, a heater casing in communication therewith, an electrical heating element within said casing, a discharge leading from said casing, valve mechanism in said discharge and having two positions of discharge, a switch comprising a housing secured to the heater casing, a pair of contacts connected in the circuit with the heating element and normally out of contact, a switch member having a circuit closing portion, and a stem connected to the valve mechanism and to the switch member, said switch member and contacts being arranged so that the circuit is closed when the discharge valve mechanism is in one discharge position and the circuit is open when the discharge valve is in the other discharge position.

3. A water heater, comprising a heater casing, a supply connected to the bottom thereof, a discharge leading from the top, a valve in the discharge, a hollow sheet metal heating element bent upon itself in U-shape in cross section with the crotch of the U toward the top of the casing, means for supporting the element within the heater casing, tubes extending from the crotch of the U to the outside of the casing, suitable electrical connections leading from the heating element through said tubes to the outside of the heater casing, and switch mechanism in circuit with the heating element.

4. A water heater, comprising an outer casing, a water supply, a discharge member, a discharge valve in the discharge member, a heating element in said casing comprising a flat hollow sheet metal casing bent upon itself to form a U-shape in cross section, resistance wire in said element casing, a tube connected to said element casing and passing out through the heater casing and inclosing the leads for the resistance wire, and switch mechanism supported by the heater casing and in circuit with the resistance wire.

5. A water heater, comprising a hollow casing connected to a source of water supply, a rotary valve at the bottom of said casing and controlling the flow of water therefrom, a shaft rotatable with said valve and extending from the bottom to the top of said casing, electrical heating means in said casing, and switch devices controlling the flow of current through said electrical heating means and operated by said shaft.

6. A water heater, comprising a hollow casing connected to a source of water supply, a valve located near the bottom of said casing and controlling the flow of water therefrom, said valve having a stem rotatable on a vertical axis, a vertical shaft rotatable with said stem and extending therefrom to the top of said casing, an electric switch located near the top of said casing and including a rotatable member turning with said shaft and carrying a contact, a coöperating contact, and electric heating means within said casing in circuit with said contacts.

In testimony whereof I affix my signature in presence of two witnesses.

ANTONIO LONGORIA.

Witnesses:
   G. O. FARQUHARSON,
   C. H. SHORTZBARGER.